(12) United States Patent
Hsin-Liang et al.

(10) Patent No.: US 7,237,954 B2
(45) Date of Patent: Jul. 3, 2007

(54) ROLLING ELEMENT RETAINER FOR A LINEAR GUIDEWAY

(75) Inventors: Chen Hsin-Liang, Taichung (TW); Wang Chin-Pei, Taichung (TW)

(73) Assignee: Hiwin Technologies Corp., Taichung Industrial Park, Taichung (TW)

( * ) Notice: Subject to any disclaimer, the term of this patent is extended or adjusted under 35 U.S.C. 154(b) by 199 days.

(21) Appl. No.: 11/194,796

(22) Filed: Aug. 1, 2005

(65) Prior Publication Data

US 2007/0025650 A1    Feb. 1, 2007

(51) Int. Cl.
*F16C 29/06*    (2006.01)
(52) U.S. Cl. .................................................... 384/45
(58) Field of Classification Search ............. 384/43–45
See application file for complete search history.

(56) References Cited

U.S. PATENT DOCUMENTS 6,116,783 A * 9/2000 Shirai et al. .................. 384/43

6,371,648 B1 * 4/2002 Kato et al. ..................... 384/45
2006/0198564 A1 * 9/2006 Chin-Pei et al. .............. 384/45

FOREIGN PATENT DOCUMENTS

JP            3349238 B2 *  11/2002

* cited by examiner

*Primary Examiner*—Thomas R. Hannon
(74) *Attorney, Agent, or Firm*—Charles E. Baxley

(57) ABSTRACT

A rolling element retainer for a linear guideway, wherein the rolling groove of the connective part of the rolling elements retaining chain is composed of a loaded area and a direction changing area. At either end of the loaded-area retainer is arranged an outward extension for mating with the direction-changing-area retainer. The outward extension extends in the direction of the rolling groove of the loaded-area retainer and abuts against a projection part of the end caps of the rolling element retainer. Therefore, not only the motion stability of the linear guideway is effectively improved, but also the rolling elements can move more smoothly.

2 Claims, 14 Drawing Sheets

ROLLING ELEMENT RETAINER FOR A LINEAR GUIDEWAY

BACKGROUND OF THE INVENTION

1. Field of the Invention

The present invention relates to a rolling element retainer, and more particularly to a rolling element retainer for a linear guideway.

2. Description of the Prior Art

Linear guideway with rolling element retaining chain has been widely used on all types of precision sliding equipment, such as numerical control machine, automatic welding machine, transportation facilities, and the like. A general linear guideway is usually assembled in such a way that the rolling elements move endlessly along an annular rolling path, while a linear guideway with rolling element retaining chain must be provided in the whole circulating path with receiving groove for the passage of the linking portion of the rolling element retaining chain. However, the receiving groove of the whole circulating path is not a unitary structure but made up of several separate parts, consequently, a height difference will be caused at the connection between the separate parts, this will adversely affect the movement of the linking portion of the rolling element retaining chain.

As shown in FIGS. 1 and 2, a sliding block 11 is mounted on a conventional linear guideway with rolling element retainer, the linear guideway generally includes a loading retainer 12 and a return retainer 13. The loading retainer 12 and the return retainer 13 are provided with a receiving groove 121, 131, respectively, for the passage of a rolling element retaining chain 14. The rolling element retaining chain 14, as shown in FIG. 3, comprises a linking portion 141 on which are disposed a plurality of spacers 143 for separating the rolling elements 142 from one another.

The connection between the receiving groove 131 of the return retainer 13 and the receiving groove 121 of the loading retainer 12 is not specially designed, when the linking portion 141 of the rolling element retaining chain 14 moves to the loading retainer 12 from the return retainer 13, some problems are likely to take place, they are to be explained as follows:

First, the rolling element retaining chain 14 of the conventional linear guideway is usually made of flexible plastic so as to make it easier to go through return retainer 13. However, when approaching the connecting portion between the return retainer 13 and the loading retainer 12, the linking portion 141 will abut against the outer periphery of the receiving groove 131 because of elasticity, as shown in FIG. 4, in which, the rolling element retaining chain 14 is simplified by a rectangular strip. When moving to the connecting portion, an angular deviation will be caused such that the rolling element retaining chain 14 will not move in the predetermined direction of the blank arrow, but will move in the real direction as indicated by the solid arrow.

Second, the loading retainer 12 is assembled with other components normally by means of pins, however, height difference will take place between the receiving groove 131 of the return retainer 13 and the receiving groove 121 of the loading retainer 12 due to the fitting and manufacturing tolerance.

Based on the above-mentioned reasons, with reference to FIG. 6, when the linking portion 141 of the rolling element retaining chain 14 passes through the receiving groove 131 of the return retainer 13, it will hit the edge of the receiving groove 121 of the loading retainer 12, such a running module will cause an unstable running of the rolling elements.

To solve this problem, JP Patent No. 3,349,238 discloses a linear guideway, in which, the connecting portion of the circulating path is not at the abutting surface between the return retainer and the loading retainer, so that the rolling elements can get through the connecting portion smoothly by adjusting the moving direction. However, this design improves the difficulty of manufacturing.

The present invention has arisen to mitigate and/or obviate the afore-described disadvantages.

SUMMARY OF THE INVENTION

The primary objective of the present invention is to provide a rolling element retainer for a linear guideway having an improved rolling groove in which the rolling element with the retaining chain can move more smoothly and stably. The respective loading portions is provided at both ends thereof with an outward extension for mating with the direction-changing-area retainer, and the extension extends in a direction of a rolling groove of the loaded-area retainer and abuts against the projection part of the direction-changing-area retainer, the extension is located outside of a guiding portion of the rolling groove of the loaded-area retainer.

The secondary objective of the present invention is to provide a simple-structured rolling element retainer for a linear guideway, wherein the extension serves to abut against the end cap, and thus the extension of the loaded-area retainers of the rolling element retainer can be easily assembled to the connecting portion of the rolling element retainer via the groove thereof.

The present invention will become more obvious from the following description when taken in connecting point with the accompanying drawings, which show, for purpose of illustrations only, the preferred embodiment in accordance with the present invention.

DETAILED DESCRIPTION OF THE PREFERRED EMBODIMENT

Figure 1:
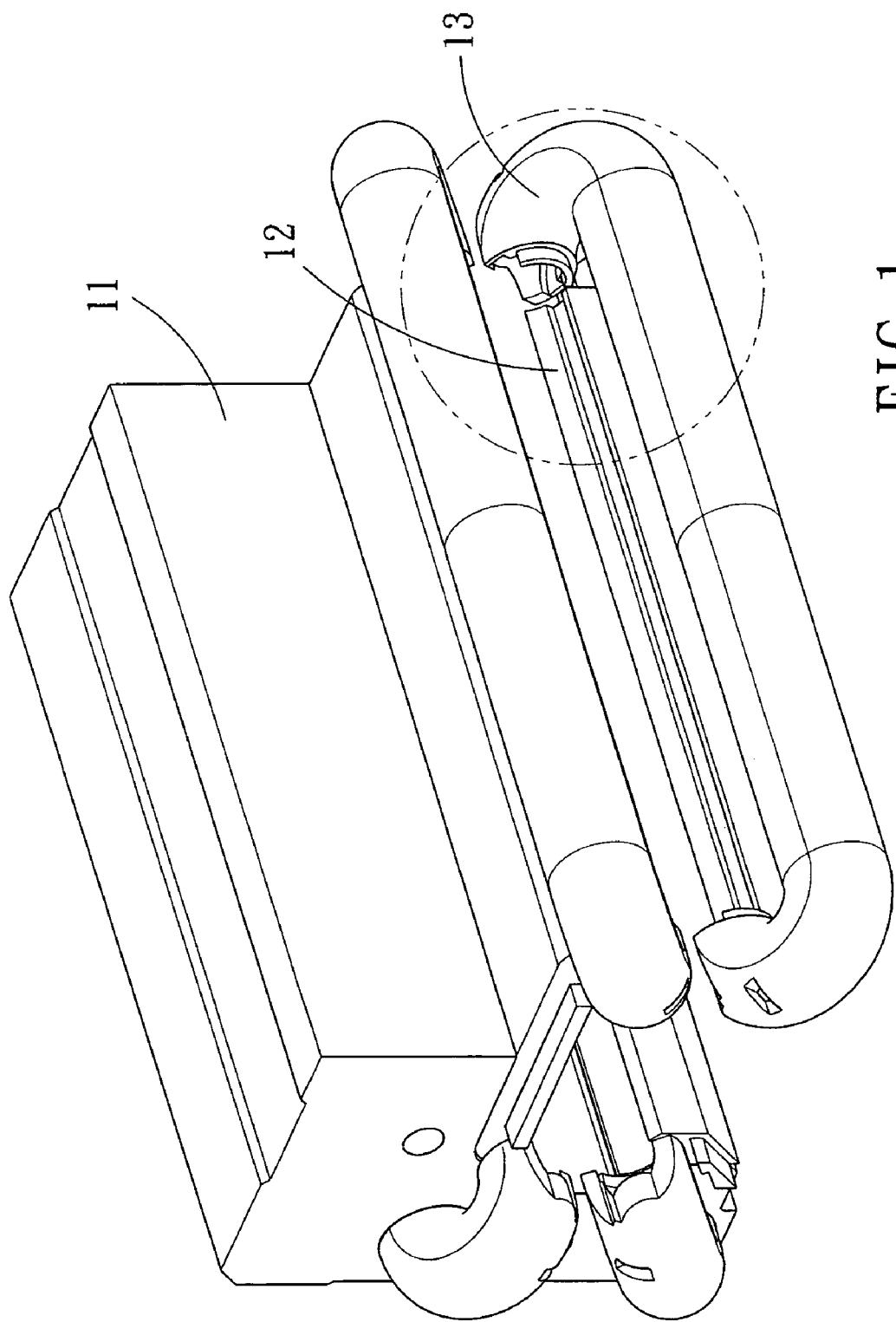
FIG. 1 is an exploded view of a conventional rolling element retainer for a linear guideway.
Figure 2:
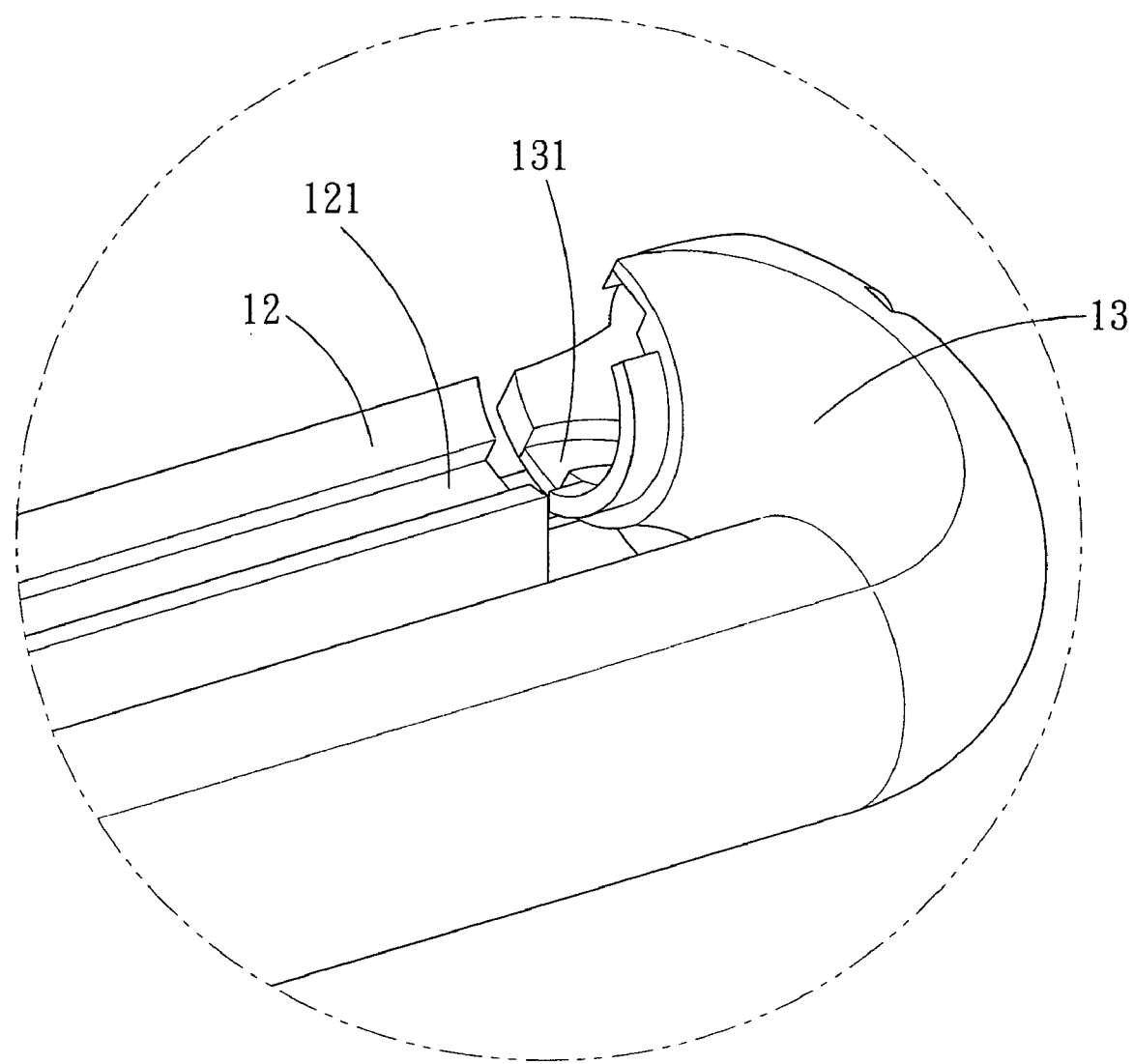
FIG. 2 is an enlarged view of a part of FIG. 1.
Figure 3:
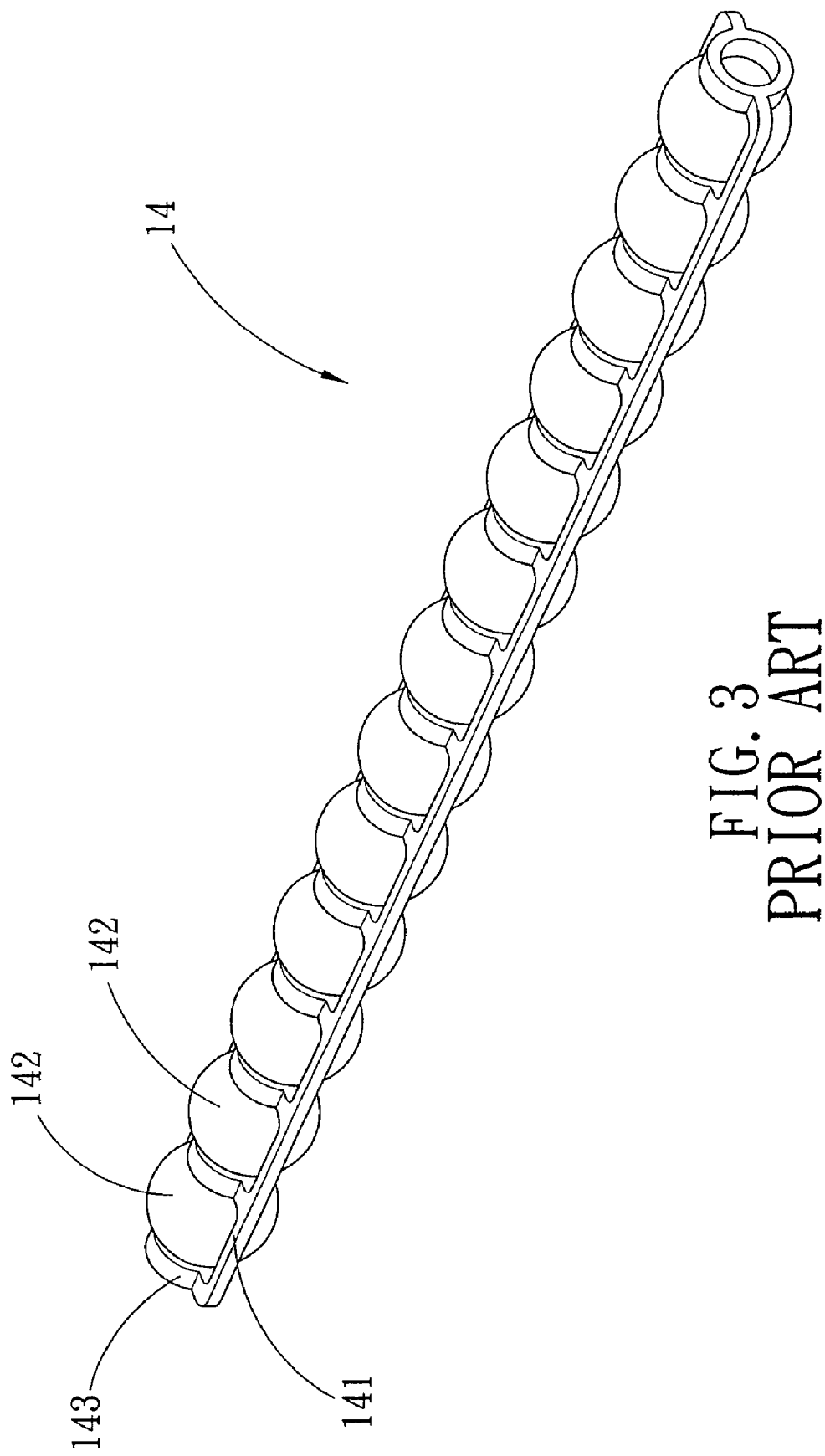
FIG. 3 shows a rolling element retaining chain.
Figure 4:
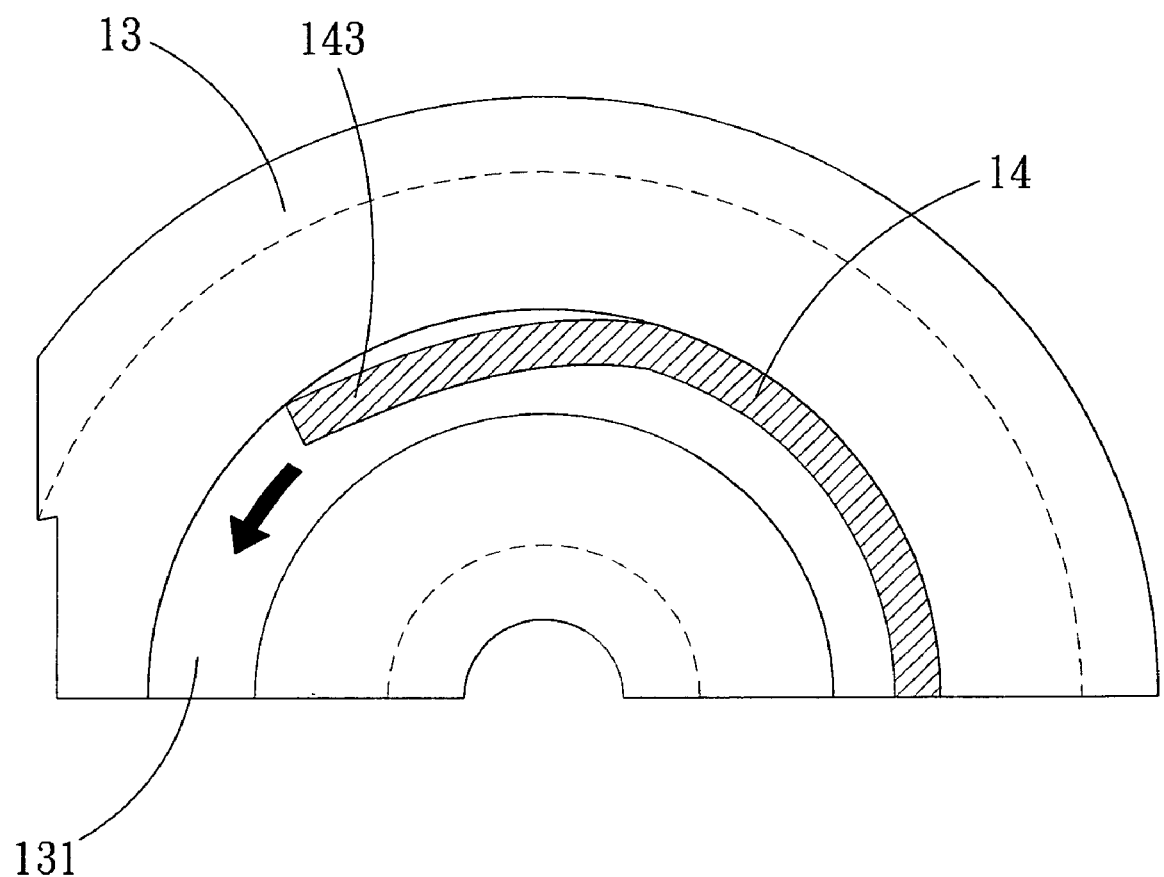
FIG. 4 shows that the connective part of a rolling element retaining chain is moving in the groove of the conventional direction-changing-area retainer.
Figure 5:
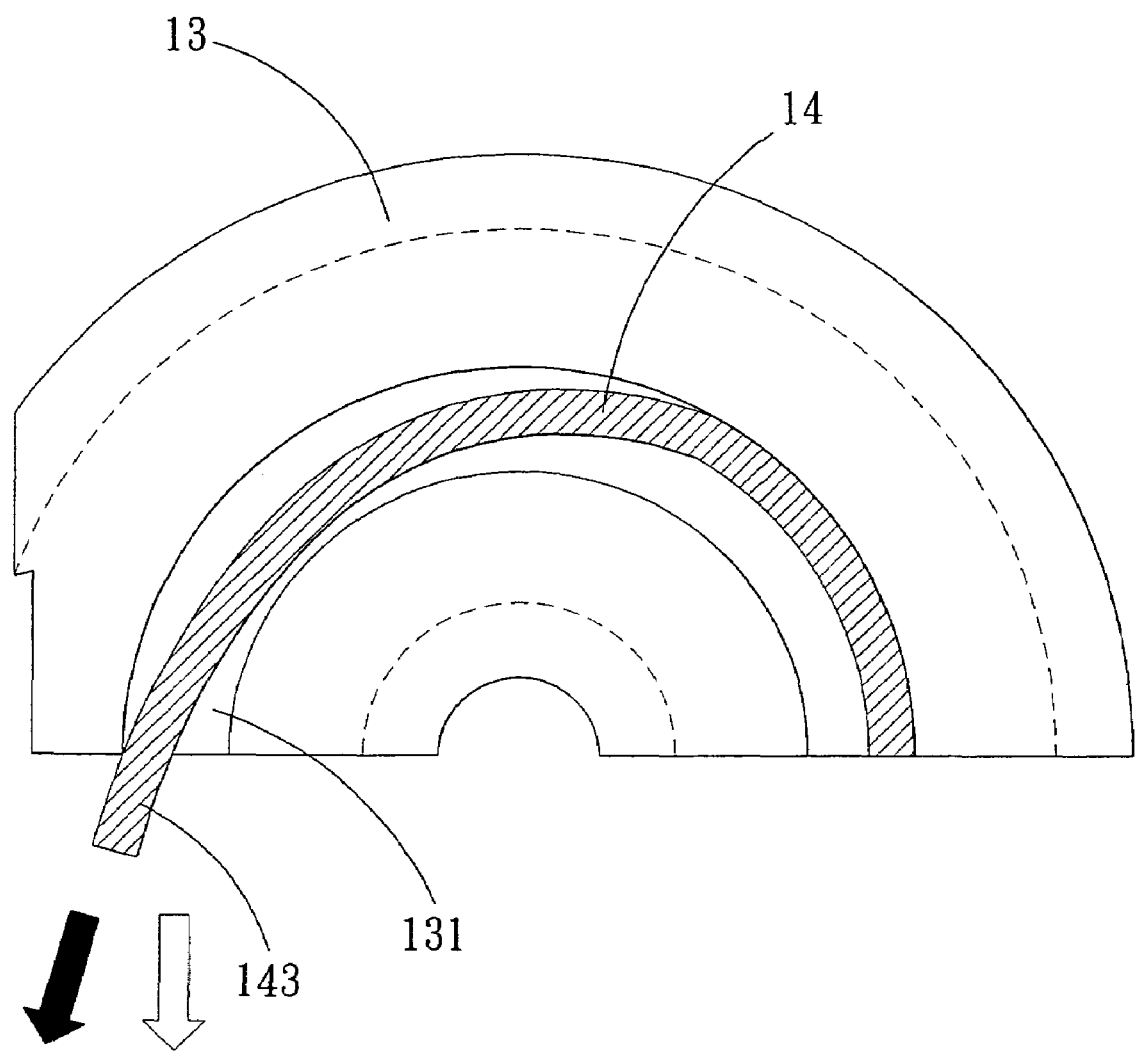
FIG. 5 shows that the connective part of a rolling element retaining chain is moving out of a return retainer of a conventional rolling element direction-changing-area retainer.
Figure 6:
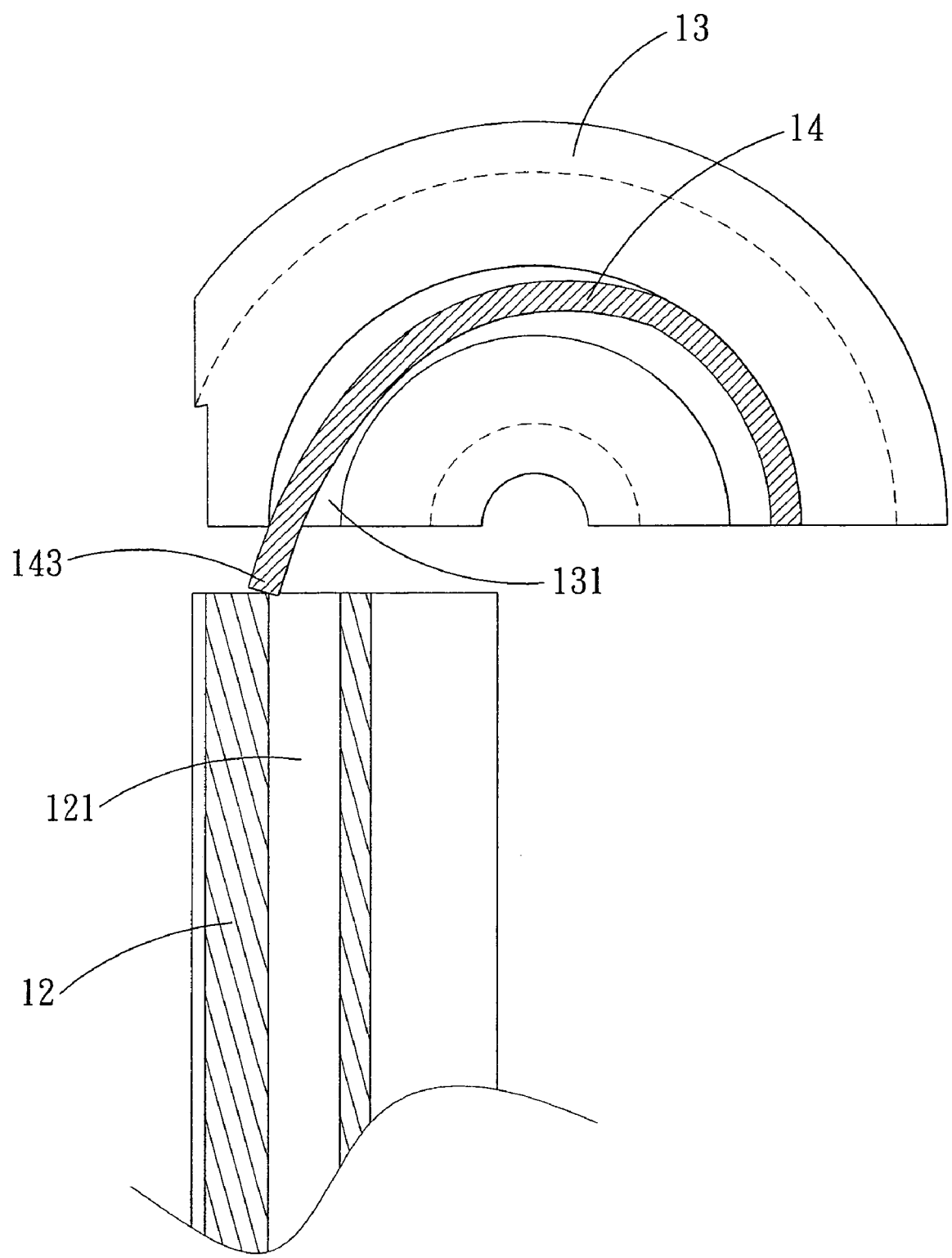
FIG. 6 shows that an end of the connective part of the rolling element retaining chain impacts the groove's edge of a conventional rolling element retainer in the loaded area.
Figure 7:
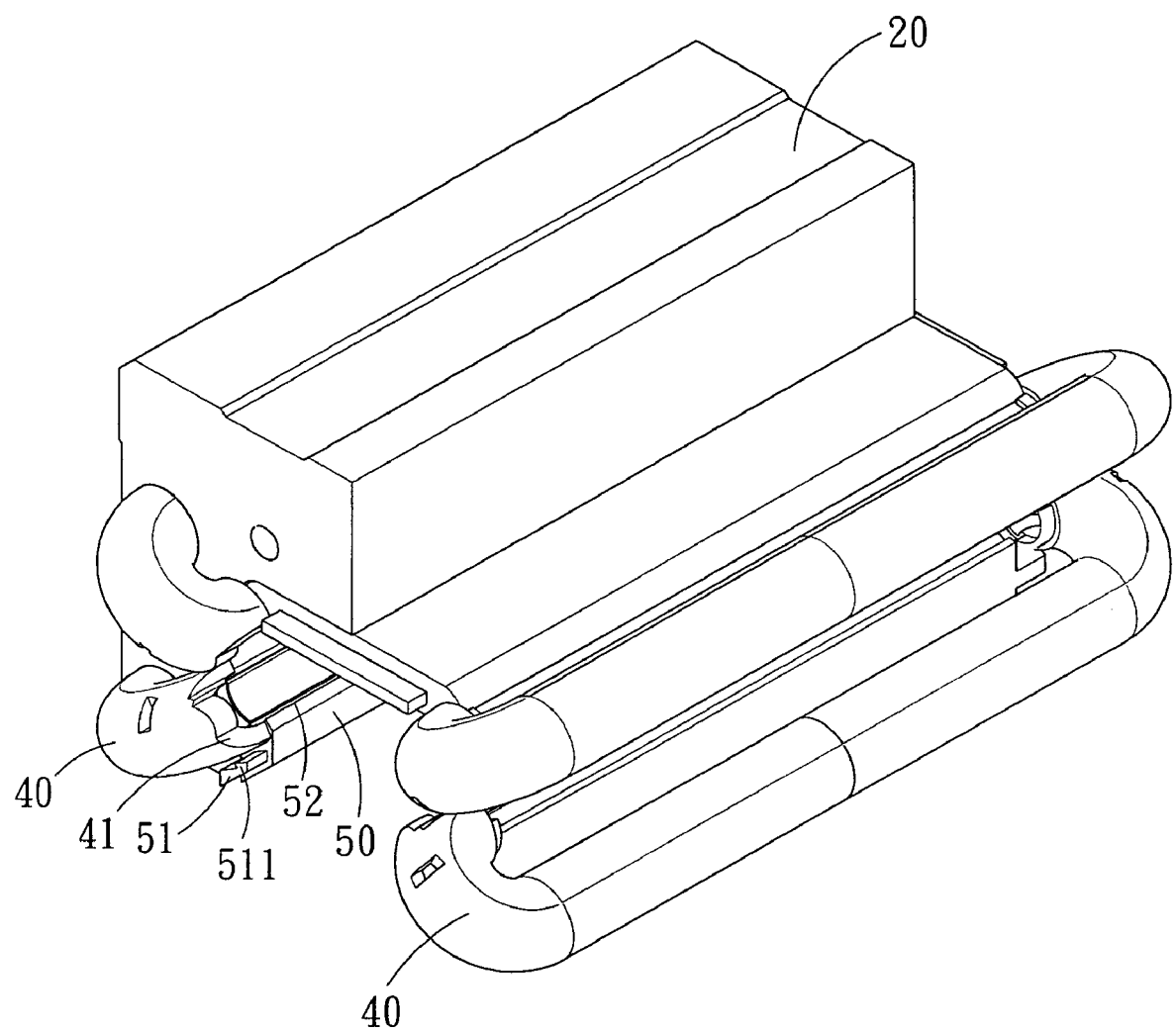
FIG. 7 is an assembly view of these rolling element retainers for a linear guideway in accordance with the present invention.
Figure 8:
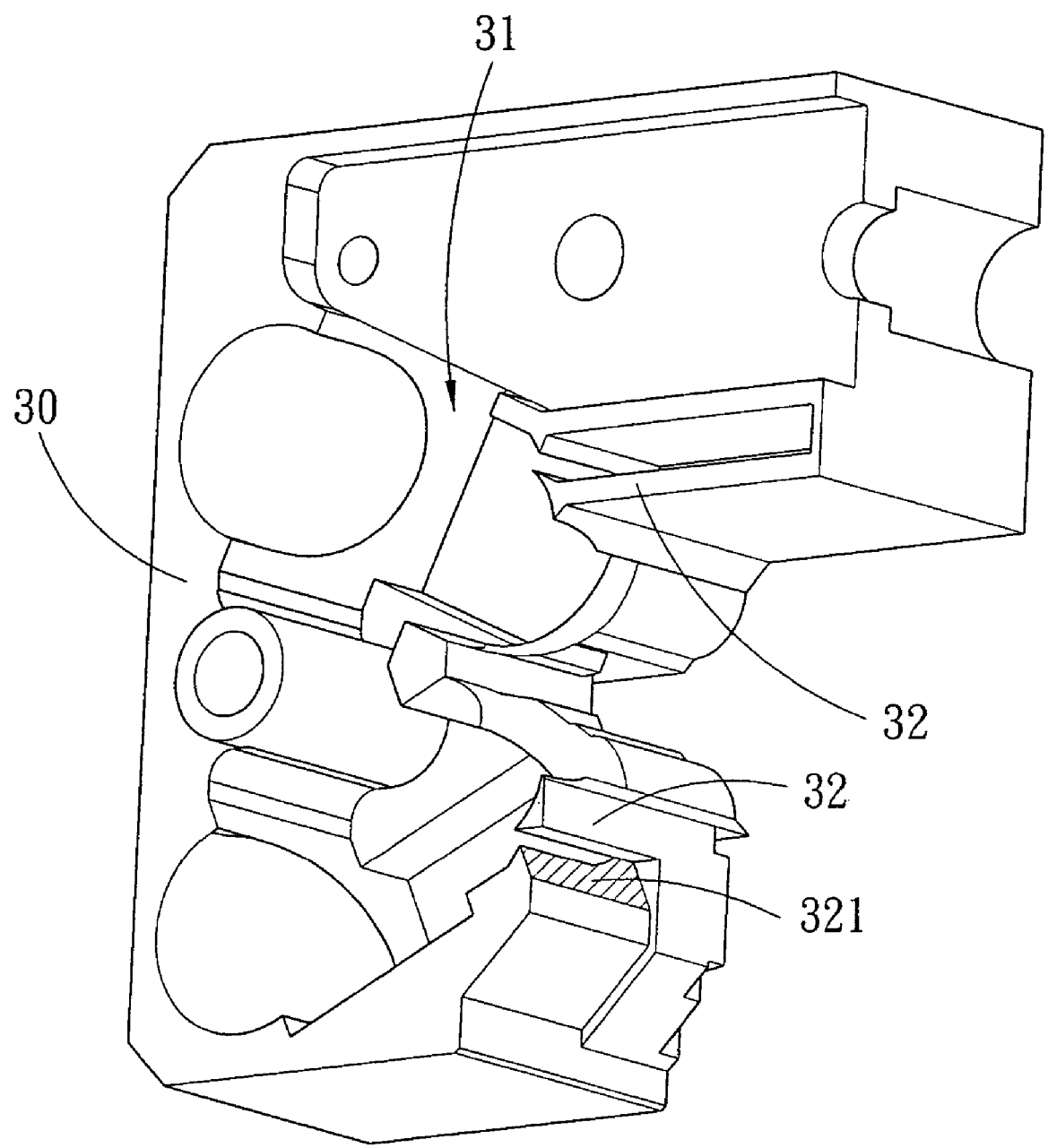
FIG. 8 is an enlarged view of an end cap of a linear guideway in accordance with the present invention.
Figure 9:
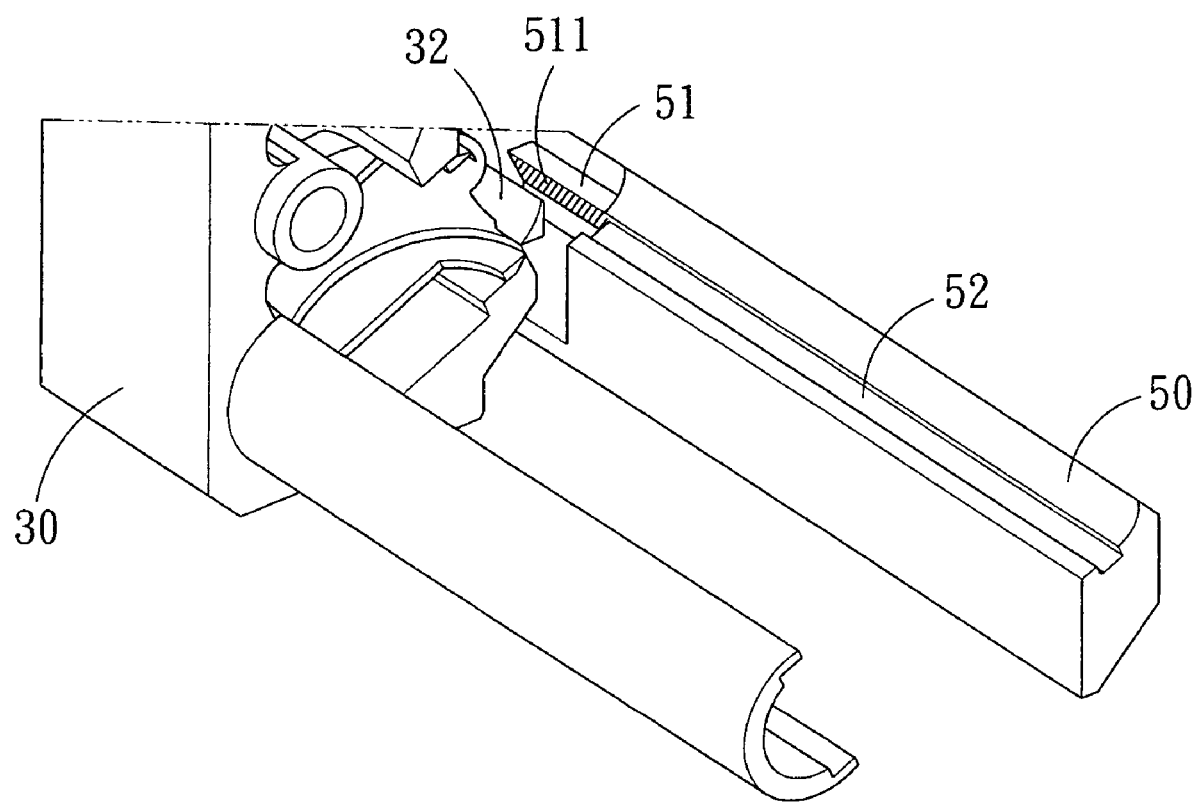
FIG. 9 is an enlarged exploded view of a part of the loaded-area retainer for a linear guideway in accordance with the present invention.
Figure 10:
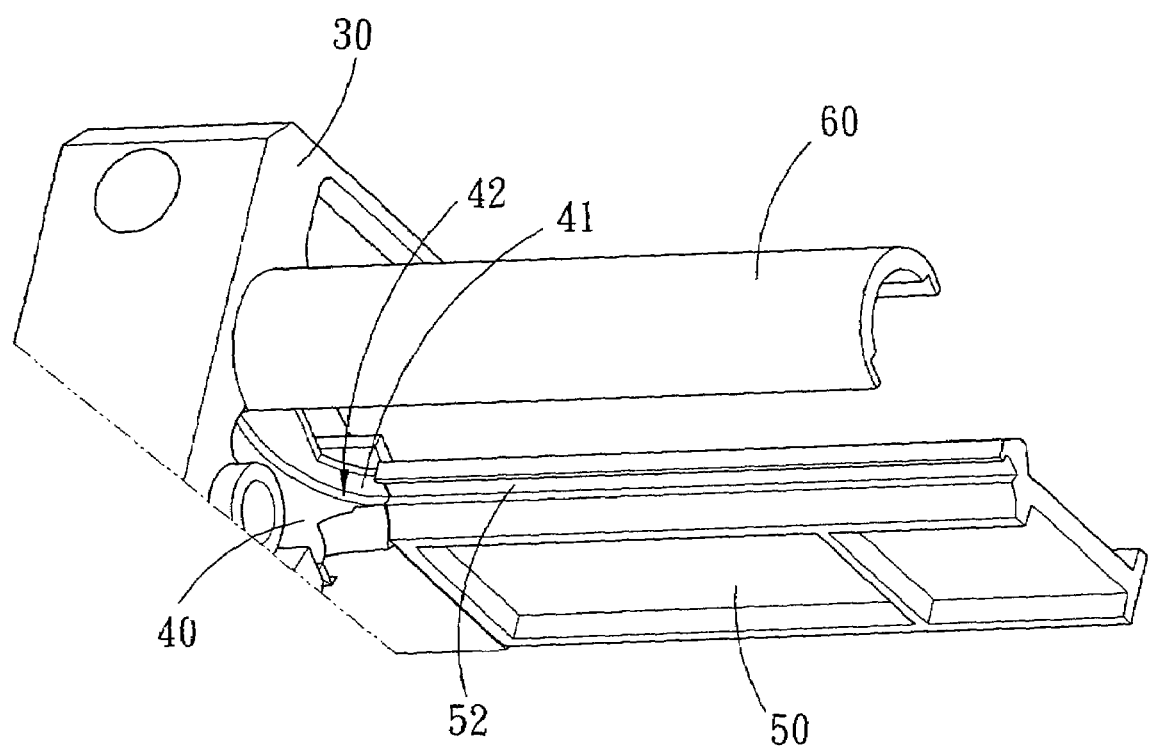
FIG. 10 is an enlarged assembly view of a part of these rolling element retainers for a linear guideway in accordance with the present invention.
Figure 11:
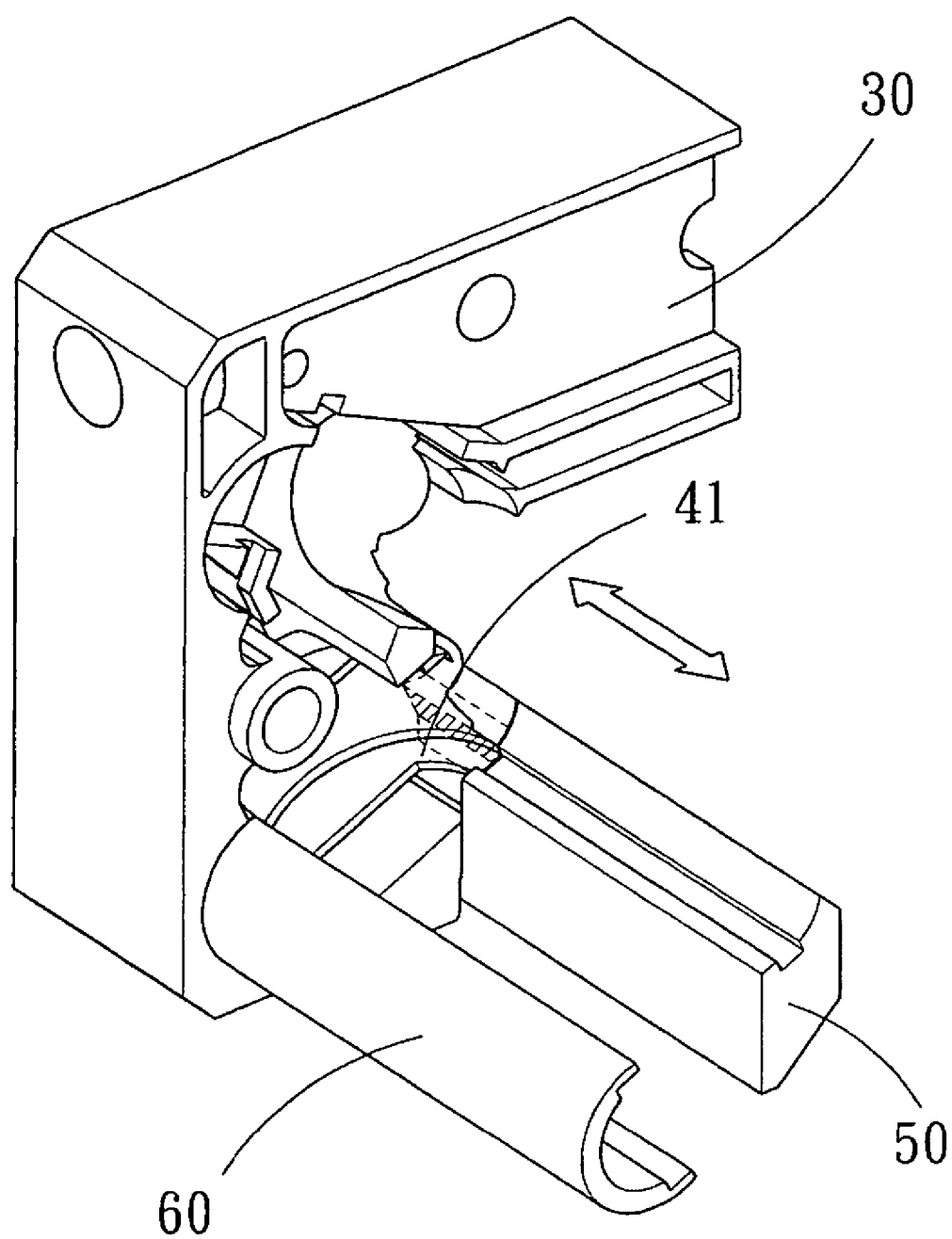
FIG. 11 is a perspective view of a part of these rolling element retainers for a linear guideway in accordance with the present invention.
Figure 11A:
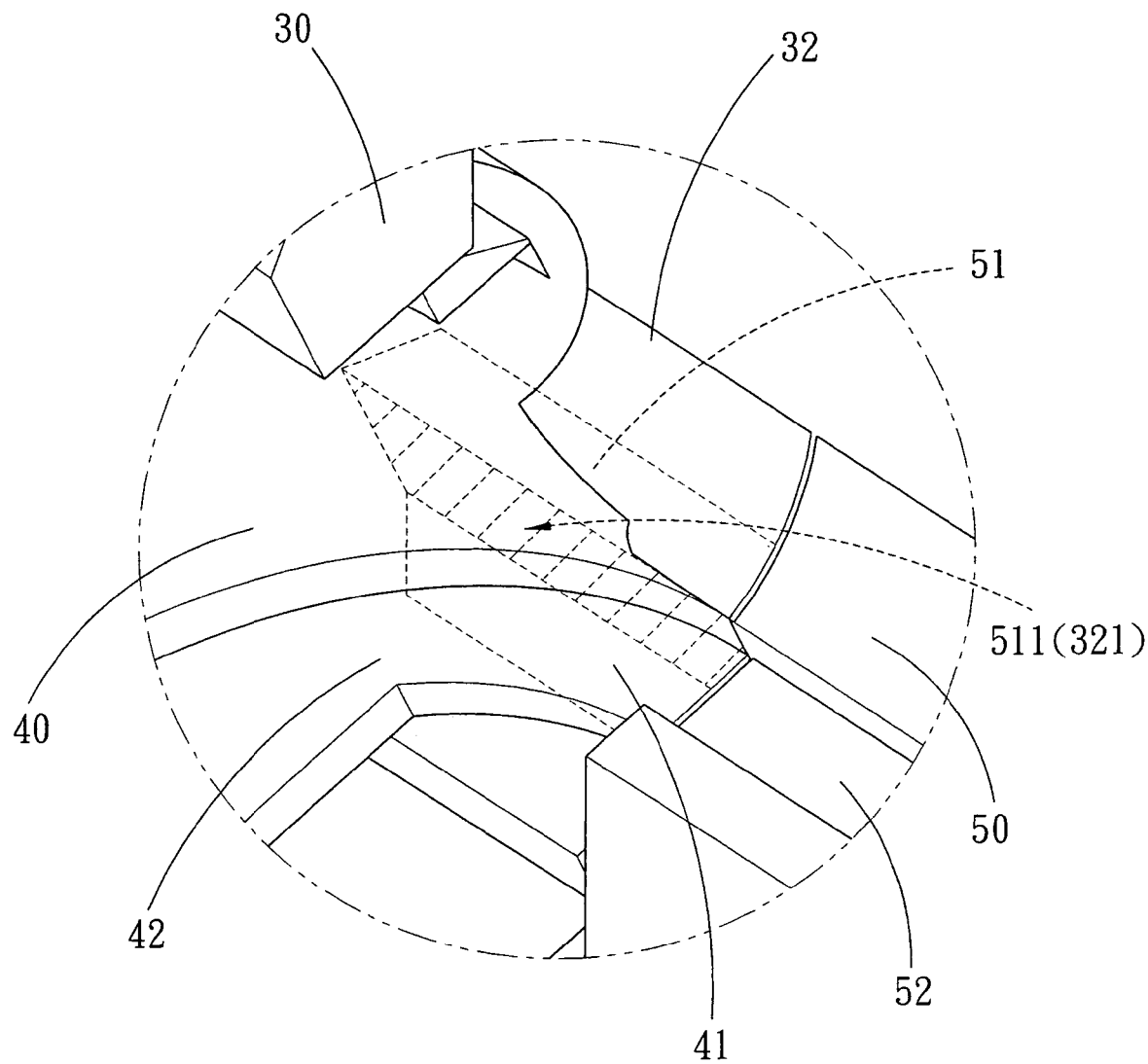
FIG. 11a is an enlarged perspective view of a part of FIG. 11.
Figure 12:
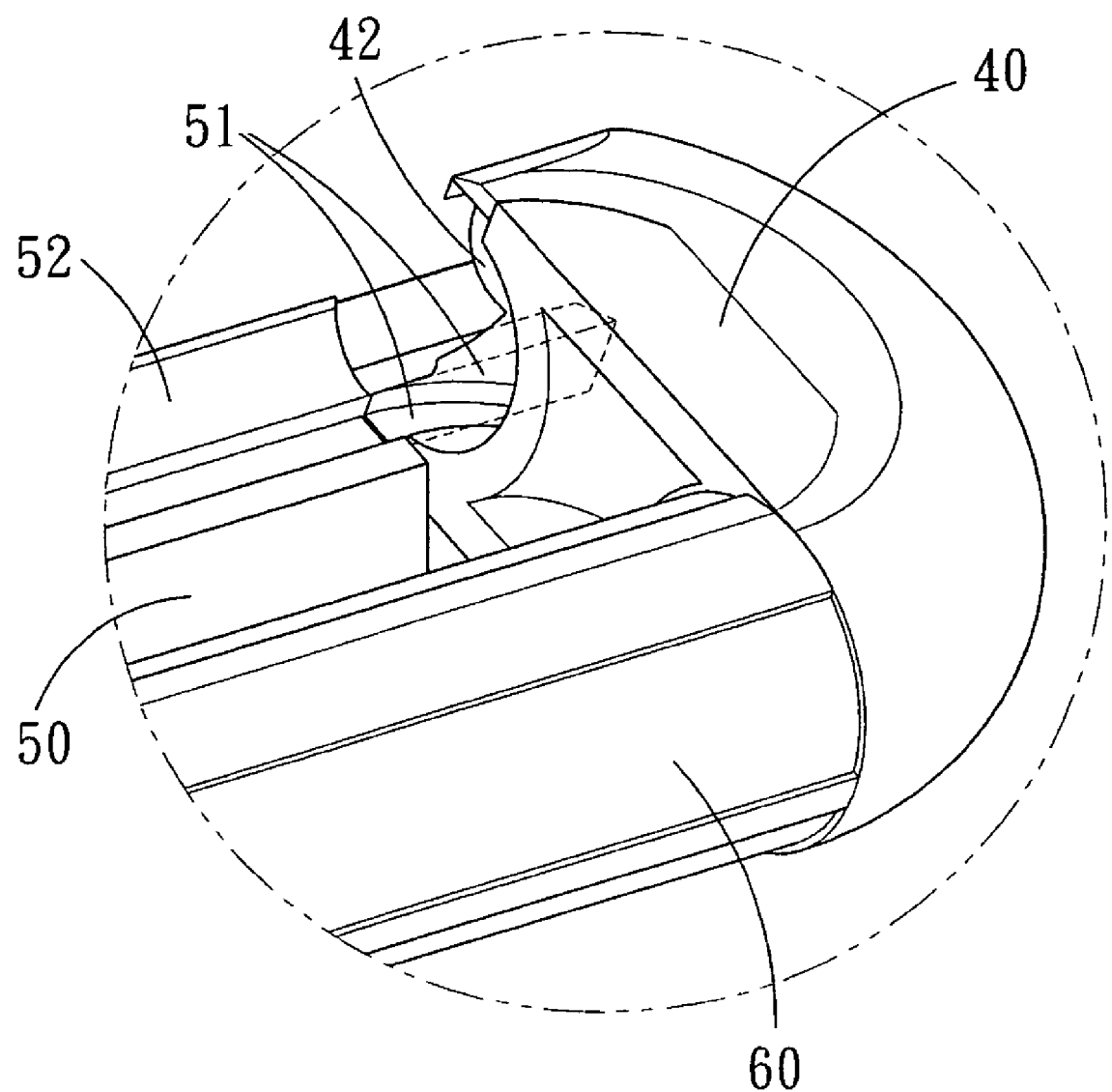
FIG. 12 is an enlarged view of a part of these rolling element retainers for a linear guideway in accordance with the present invention.

Referring to FIGS. 7-13, a type of the rolling element retainer for a linear guideway in accordance with the present invention comprises a slide block 20, a pair of end caps 30, a rolling passage 60, a plurality of direction-changing-area retainers 40 and a plurality of loaded-area retainers 50.

The end caps 30 are attached at either side of the slide block 20, and the direction-changing-area retainers 40 are disposed in an inner space 31 of the respective end caps 30.

The rolling passage 60 is arranged in the slide block 20.

The direction-changing-area retainers 40 each is provided at the end of the rolling groove 42 thereof with a guiding portion 41 that tapers outwardly toward its free end. The loaded-area retainers 50 are arranged in the slide block 20. The characteristics of this embodiment are explained as follows:

The end caps 30 are defined in the inner space 31 with a projection part 32 for mating with the guiding portion 41 and the rolling groove 42 of the direction-changing-area retainers 40. On the projection part 32 is formed a mounting plane 321.

The respective loaded-area retainers 50 is provided at both ends thereof with an outward extension 51 for mating with the direction-changing-area retainers 40 and is further provided with a rolling groove 52 for mating with the rolling groove 42 of the respective direction-changing-area retainers 40. The extension 51 extends in the direction of the rolling groove 52 of the extension 51 and abuts against the lateral side of the projection part 32 of the end caps 30 in such a manner that an abutment surface 511 of the extension 51 abuts against the mounting plane 321 of the projection part 32. The extension 51 is located outside of the guiding portion 41 of the direction-changing-area retainers 40.

By such arrangements, the extension 51 of the loaded-area retainer 50 can be easily positioned on the outer side of the projection part 32 of the end caps 30, and the components of the rolling element retainer can be produced more easily.

As aforementioned that the abutment surface 511 of the extension 51 abuts against the mounting plane 321 of the projection part 32, plus the extension 51 is located outside of the guiding portion 41 of the direction-changing-area retainer 40. Therefore, there will be no gap between the guiding portion 41 of the direction-changing-area retainer 40 and the rolling groove 52 of the loaded-area retainers 50, thus preventing interference or impact to the connective part of the rolling element retaining chain.

Figure 13:
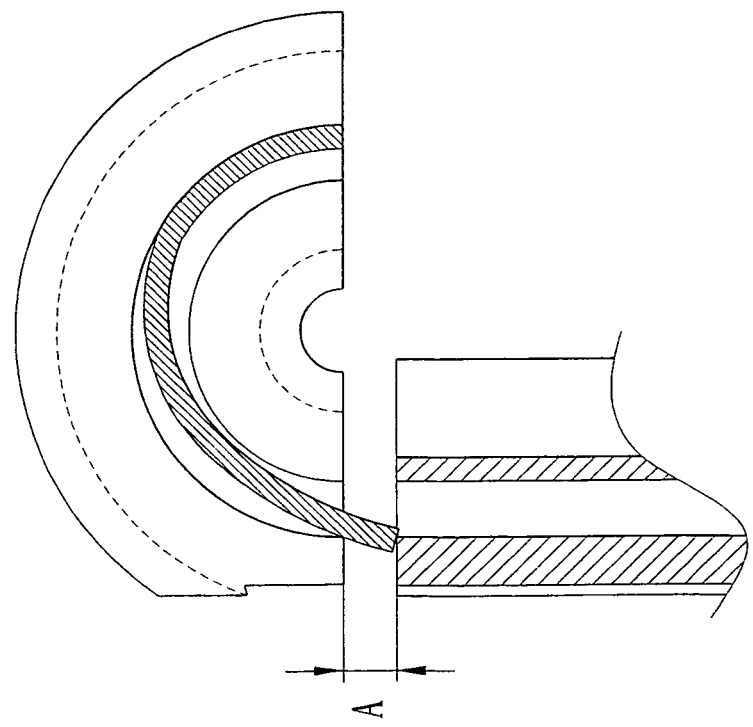
FIG. 13 illustrates the respective parameters of the loaded-area retainer for a linear guideway in accordance with the present invention.
Figure 13:
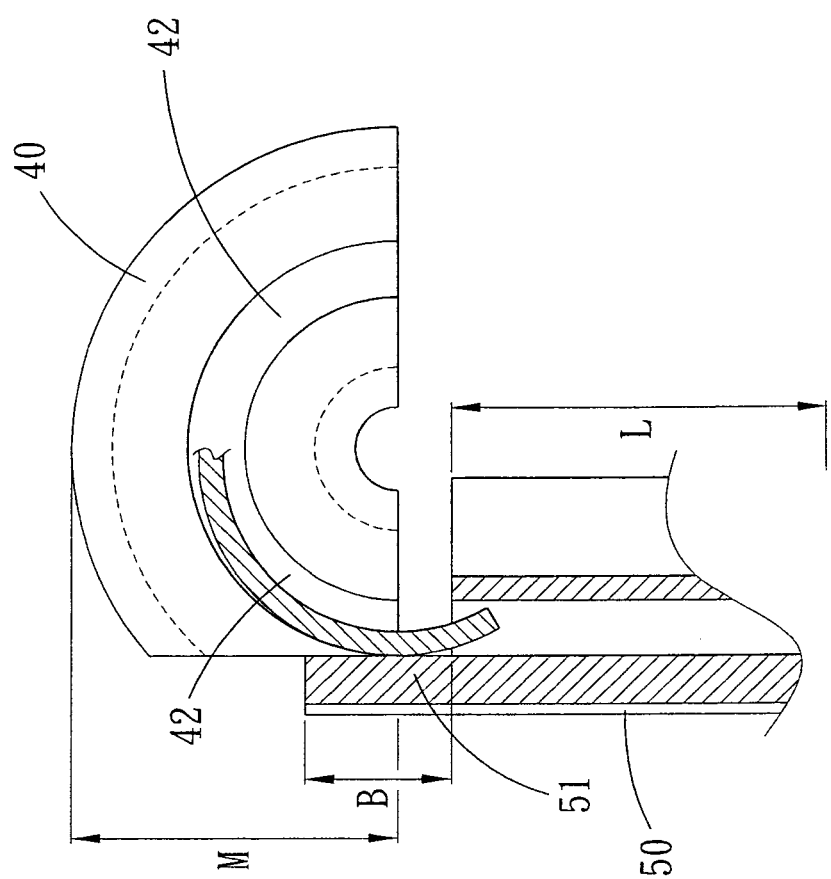

Referring to FIG. 13, without changing any components, the present invention can use the extension 51 to counteract the motion deviation of the rolling element retaining chain, allowing the connective part of the rolling element retaining chain to get over the height difference at the connecting point between the loaded-area retainer 50 and the direction-changing-area retainers 40 of the linear guideway.

Conventionally, a gap between two components is designed to absorb potential expansion and contraction. To overcome the gap-induced problems, the present invention minimizes the gap between the guiding portion 41 of the direction-changing-area retainer 40 and the rolling groove 52 of the loaded-area retainer 50, plus the extension 51 keeps abutting against the outside of the guiding portion 41 of the direction-changing-area retainers 40, thus forming a non-height-difference rolling groove of a rolling element retainer, allowing the rolling element-retaining chain to slide in and out of the rolling groove 52 of the loaded-area retainer 50 very smoothly.

Since the extension 51 extends in the direction of the rolling groove 52 of the loaded-area retainer 50 and abuts against the lateral side of the projection part 32 of the end caps 30 in such a manner that an abutment surface 511 of the extension 51 abuts against the mounting plane 321 of the projection part 32, such arrangements make the operation of the present invention more smooth.

Furthermore, the extension 51 can be made easily without too much modification to the loaded-area retainer 50 of the linear guideway, and manufacturing error can be controlled to the least since it is made by elastic ejection forming.

It will be noted that a gap must be left between the guiding portion 41 of the direction-changing-area retainer 40 and the rolling groove 52 of the loaded-area retainer 50, because of the undermentioned reasons:

1. the temperature of operating environment for linear guideway ranges from −20° C.~100° C., and a gap is designed to absorb the temperature-induced contraction and expansion.

2. in assembly, two mating components must be assembled with a suitable assembling gap there between for easy assembly.

The gap left between the guiding portion 41 of the direction-changing-area retainer 40 and the rolling groove 52 of the loaded-area retainer 50 can be expressed as:

$$C = L \times w \times \Delta t$$

$$D = 2p$$

$$A = C + D = L \times w \times \Delta t + 2p$$

Wherein

A: represents the gap left between the guiding portion 41 of the direction-changing-area retainer 40 and the rolling groove 52 of the loaded-area retainer 50;

C: expansion and contraction caused by temperature change

D: assembling gap $\Delta t$: range of operating temperature w: coefficient of thermal expansion The length B of the extension 51 must be larger than the gap A in order to cover the gap A.

$$B > A = L \times w \times \Delta t + 2p$$

And the length B of the extension 51 also needs to be less than the total value of the distance between the top and the bottom of the returning portion plus the gap A, thus the rolling element retainer can be assembled.

Therefore, the length B of the extension 51 is optimally expressed as:

$$A + M > B > A = L \times w \times \Delta t + 2p$$

wherein L represents the length of the rolling element retainer, M represents the distance between the top and the bottom of the direction-changing-area retainer, and p represents manufacturing tolerance.

While we have shown and described various embodiments in accordance with the present invention, it should be clear to those skilled in the art that further embodiments may be made without departing from the scope of the present invention.

What is claimed is:

1. A rolling element retainer for a linear guideway, comprising a plurality of loaded-area retainers and a plurality of direction-changing-area retainers, and an end of a rolling groove of the respective the direction-changing-area retainer is located at an inner side of a projection part of two end caps of the rolling element retainer;

wherein the loaded-area retainer is provided at both ends thereof with an outward extension for mating with the direction-changing-area retainer, and the extension extends in a direction of a rolling groove of the loaded-area retainer and abuts against the projection part of the end caps of the rolling element retainer, the extension is located outside of a guiding portion of the direction-changing-area retainer, a length of the extension is optimally expressed as:

$$A+M>B>A=L\times w\times \Delta t+2p$$

wherein A represents a gap left between the direction-changing-area retainer and the loaded-area retainer, B is a length of the extension, L represents a length of the loaded-area retainer, M represents a distance from a top and a bottom of the direction-changing-area retainer, p represents manufacturing tolerance range, $\Delta t$ represents a range of operating temperature, and w represents a coefficient of thermal expansion.

2. The rolling element retainer for a linear guideway as claimed in claim 1 comprising a slide block, the two end caps, a rolling passage, the direction-changing-area retainer and the loaded-area retainer, wherein the end caps are attached at either side of the slide block, and the direction-changing-area retainers are disposed in inner spaces of the respective end caps;

the rolling passage is arranged in the slide block;

the direction-changing-area retainer is provided at an end of the rolling groove thereof with a guiding portion that tapers outwardly toward its free end, and the direction-changing-area retainers are arranged in the slide block;

the end caps is defined in the inner space thereof with the projection part for mating with the guiding portion and the rolling groove of the direction-changing-area retainer, and on the projection part is formed a mounting plane;

the rolling groove of the loaded-area retainer mates with the rolling groove of the direction-changing-area retainers, and the mounting plane of the projection part abuts against an abutment surface of the extension.

* * * * *